US009152350B2

(12) United States Patent
Marukame et al.

(10) Patent No.: US 9,152,350 B2
(45) Date of Patent: Oct. 6, 2015

(54) SEMICONDUCTOR MEMORY DEVICE CONTROLLING WRITE OR READ PROCESS

(71) Applicant: KABUSHIKI KAISHA TOSHIBA, Minato-ku, Tokyo (JP)

(72) Inventors: Takao Marukame, Kanagawa (JP); Atsuhiro Kinoshita, Kanagawa (JP); Takahiro Kurita, Kanagawa (JP); Yoshifumi Nishi, Niigata (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 212 days.

(21) Appl. No.: 13/913,708

(22) Filed: Jun. 10, 2013

(65) Prior Publication Data

US 2014/0025865 A1 Jan. 23, 2014

(30) Foreign Application Priority Data

Jul. 19, 2012 (JP) .................................. 2012-160309

(51) Int. Cl.
*G06F 12/10* (2006.01)
*G06F 3/06* (2006.01)
*G06F 12/02* (2006.01)

(52) U.S. Cl.
CPC ............ *G06F 3/0679* (2013.01); *G06F 3/0613* (2013.01); *G06F 3/0619* (2013.01); *G06F 3/0655* (2013.01); *G06F 3/0656* (2013.01); *G06F 12/0246* (2013.01); *G06F 12/1009* (2013.01)

(58) Field of Classification Search
CPC .. G06F 12/0246; G06F 12/1009; G06F 3/067
USPC ......................................... 711/103, 118, 202
See application file for complete search history.

(56) References Cited

U.S. PATENT DOCUMENTS

| 2011/0055458 A1* | 3/2011 | Kuehne ......................... 711/103 |
| 2012/0054421 A1* | 3/2012 | Hiratsuka et al. ............. 711/103 |
| 2013/0042055 A1 | 2/2013 | Kinoshita et al. |
| 2013/0042060 A1 | 2/2013 | Marukame et al. |
| 2014/0006834 A1 | 1/2014 | Ishii et al. |

FOREIGN PATENT DOCUMENTS

| JP | 2009-87509 | 4/2009 |
| JP | 2012-48361 | 3/2012 |
| JP | 2014-10610 | 1/2014 |

OTHER PUBLICATIONS

Notice of Rejection issued by the Japanese Patent Office on Jun. 17, 2014, for Japanese Patent Application No. 2012-160309, and English-language translation there of.
Marukame, T. et al., "Memory System Including Key-Value Store," U.S. Appl. No. 13/569,605, filed Aug. 8, 2012.
Kinoshita, A. et al., "Memory System Including Key-Value Store," U.S. Appl. No. 13/569,542, filed Aug. 8, 2012.

* cited by examiner

*Primary Examiner* — Than Nguyen
(74) *Attorney, Agent, or Firm* — Finnegan, Henderson, Farabow, Garrett & Dunner, L.L.P.

(57) ABSTRACT

According to an embodiment, a semiconductor memory device includes a controller and a second storage unit. The controller is configured to control a write process of writing data into a first storage unit in which data supplied from a host device are stored or a read process of reading the data stored in the first storage in response to a request from the host device. The second storage unit is temporarily used in the write process or the read process. The second storage unit includes a nonvolatile third storage unit having an area for storing a duplicate of the data to be written by the write process; and a nonvolatile fourth storage unit having a work area for the write process or the read process and having a higher read/write speed than the third storage unit.

19 Claims, 7 Drawing Sheets

SEMICONDUCTOR MEMORY DEVICE CONTROLLING WRITE OR READ PROCESS

CROSS-REFERENCE TO RELATED APPLICATION

This application is based upon and claims the benefit of priority from Japanese Patent Application No. 2012-160309, filed on Jul. 19, 2012; the entire contents of which are incorporated herein by reference.

FIELD

Embodiments described herein relate generally to a semiconductor memory device.

BACKGROUND

As examples of storage devices included in general host systems such as computer systems, there are magnetic hard disk drives (HDD), solid state drives (SSD) having nonvolatile semiconductor memories such as NAND flash memories mounted thereon, and embedded NAND flash memories. SSDs and embedded NAND flash memories are classified as storages, but can also be described as memory systems with extended sizes.

Such a memory system is constituted by an interface, a first memory block, a second memory block and a controller, for example. The first memory block stores data, and the second memory block is a buffer memory for writing/reading data. The first memory block is a nonvolatile memory that is larger than the second memory block but has a lower access speed. The second memory block is a temporary memory for processing an address translation table of the first memory block and is also used for compensating for the difference between the transmission rate of the interface and the write/read rate of the first memory block.

For example, the first memory block is nonvolatile NAND flash memory and the second memory block is a volatile DRAM or SRAM. When reading from NAND flash memory is performed, voltage is also applied to gates of unselected memory cells (unselected memory cells of pages not to be read). Accordingly, when reading is repeated, there is a problem of read disturb causing destruction of data stored in the memory cells and bit errors. As a measure against the read disturb, error correction using error correction coding (ECC) has been performed.

The second memory block that functions as a buffer memory used for ECC processing and the like is a volatile memory, and there has been a problem that data temporarily held in the second memory block are also lost when power is cut off during writing/reading of data, for example.

DETAILED DESCRIPTION

According to an embodiment, a semiconductor memory device includes a controller and a second storage unit. The controller is configured to control a write process of writing data into a first storage unit in which data supplied from a host device are stored or a read process of reading the data stored in the first storage in response to a request from the host device. The second storage unit is temporarily used in the write process or the read process. The second storage unit includes a nonvolatile third storage unit having an area for storing a duplicate of the data to be written by the write process; and a nonvolatile fourth storage unit having a work area for the write process or the read process and having a higher read/write speed than the third storage unit.

Embodiments of a semiconductor memory device according to the present invention will be described below in detail with reference to the accompanying drawings.

First Embodiment

Figure 1:
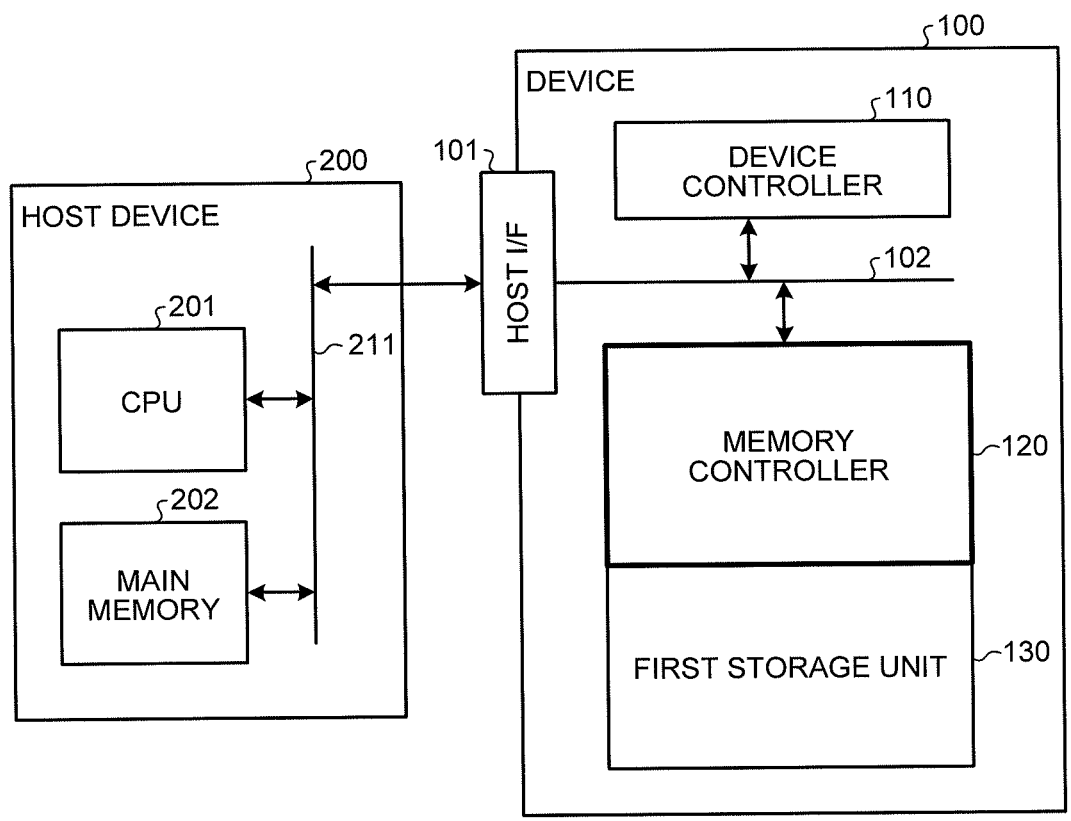
FIG. 1 is a diagram illustrating an exemplary hardware configuration of a semiconductor memory device according to a first embodiment.

FIG. 1 is a block diagram illustrating an example of hardware configurations of a device 100 that is a semiconductor memory device and a host device 200 according to a first embodiment. As illustrated in FIG. 1, the host device 200 includes a CPU 201, a main memory 202, and a bus 211 connecting the CPU 201 and the main memory 202.

The device 100 includes a host interface 101, a device controller 110, a memory controller 120, and a first storage unit 130. The host interface 101, the device controller 110 and the memory controller 120 are connected via a bus 102. In the device 100, a high-speed and efficient bus line arrangement is desirable. In the meantime, two or more types of bus lines may be used in the device 100 owing to a difference between interface standards and external interface standards, for example.

The host device 200 is connected to the host interface 101 via the bus 211 such as an AMBA (advanced microcontroller bus architecture). The host interface 101 is appropriately selected from an SATA (serial advanced technology attachment), a PCI Express, an eMMC (embedded MMC), a UFS ("universal flash storage"), a USB (universal serial bus) and the like.

The host interface 101 can receive request information indicating a request from the host device 200, which is a host device of the device 100. Examples of the request information in the present embodiment include a read request requesting to write data into the first storage unit 130 and a read request requesting to read data stored in the first storage unit 130. In this example, a write request contains a write command instructing to perform writing, data to be written according to the write command, and a logical address indicating the place to which the data are assigned among virtual space addresses in a program. A read request contains a read command instructing to perform reading, and a logical address indicating the place to which data to be read according to the read command are assigned among virtual space addresses in a program. The logical address is specified by the host device 200.

The device controller 110 interprets the request information received by the host interface 101, and transmits information to be transferred to the memory controller 120 to the memory controller 120. In the present embodiment, the device controller 110 transmits the request information as received by the host interface 101 to the memory controller 120 without any change. The device controller 110 may include a working memory such as an SRAM for storing data used during operation. Note that the working memory of the device controller 110 may be provided in an external device connected to the device controller 110 via a bus line.

The memory controller 120 controls a write process for writing data into the first storage unit 130 or a read process for reading data stored in the first storage unit 130 according to request information received from the device controller 110. Detailed functions of the memory controller 120 will be described later.

The first storage unit 130 is a device for storing data supplied from the host device 200. In the present embodiment, the first storage unit 130 also stores logical-to-physical translation information indicating association between a logical address associated with data for which a request is made from the host device 200 and a physical address indicating the place where the data are stored or to be stored in the first storage unit 130. In this example, the logical-to-physical translation information has a data structure in the form of a table. In the following description, the logical-to-physical information in the present embodiment will be referred to as a "logical-to-physical translation table" (may also be referred to as an "L2P table").

The first storage unit 130 is NAND flash memory that is a nonvolatile semiconductor memory, for example. The first storage unit 130 may be constituted by a plurality of chips so as to increase the storage capacity. The first storage unit 130 is not limited to the above, and any storage medium can be applied thereto as long as it is a semiconductor memory having memory nonvolatility. Examples of the first storage unit 130 include nonvolatile memories such as an MRAM (magnetoresistive random access memory), an ReRAM (resistance random access memory), an FeRAM (ferroelectric random access memory), and a PCRAM (phase-change random access memory). What is important in selecting a memory type from these examples, however, is that the storage units other than the first storage unit 130, which will be described later, have a higher access speed than that of the first storage unit 130.

Figure 2:
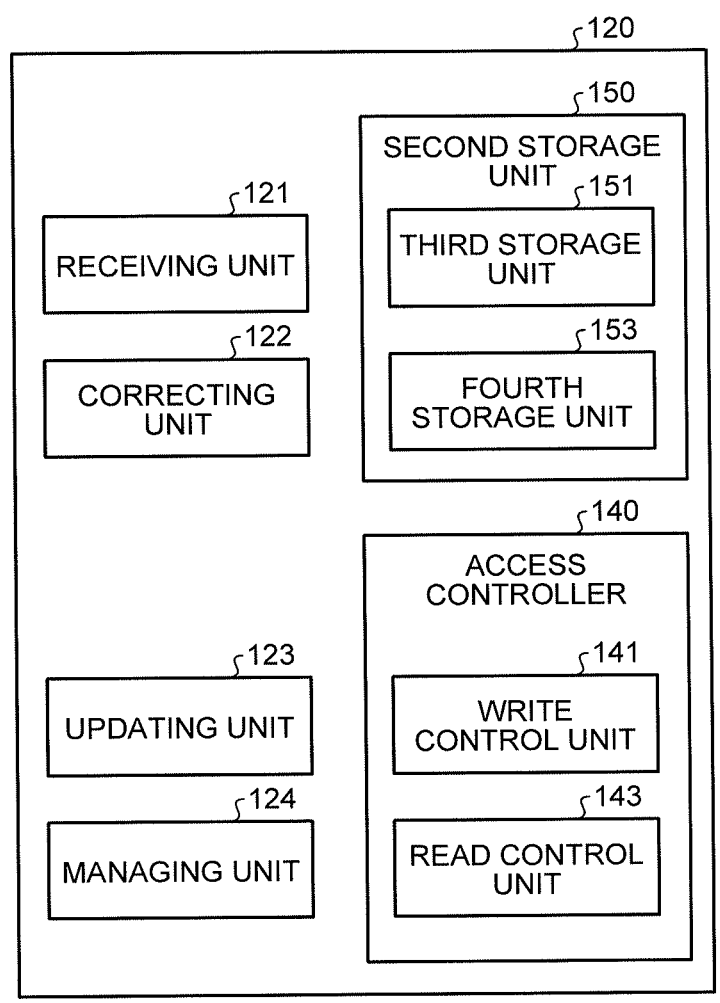
FIG. 2 is a diagram illustrating an exemplary functional configuration of a memory controller according to the first embodiment.

Next, detailed functions of the memory controller 120 will be described. FIG. 2 is a block diagram illustrating an exemplary functional configuration of the memory controller 120. As illustrated in FIG. 2, the memory controller 120 includes a receiving unit 121, an access controller 140, a second storage unit 150, a correcting unit 122, an updating unit 123, and a managing unit 124. The receiving unit 121 receives request information (a write request or a read request) transmitted from the device controller 110.

The access controller 140 controls a write process or a read process according to request information (a request from the host device 200) received by the receiving unit 121. As illustrated in FIG. 2, the access controller 140 includes a write control unit 141 and a read control unit 143. When a write request is received by the receiving unit 121, the write control unit 141 controls a write process according to the received write request. When a read request is received by the receiving unit 121, the read control unit 143 controls a read process according to the received read request.

The second storage unit 150 functions as a buffer memory used temporarily while the write process or the read process is performed. As illustrated in FIG. 2, the second storage unit 150 includes a third storage unit 151 and a fourth storage unit 153. The third storage unit 151 is a nonvolatile memory. The third storage unit 151 has an area for storing a duplicate of data to be written by the write process. In the present embodiment, the third storage unit 151 is a memory having higher durability against rewriting/reading than the first storage unit 130. For example, when the first storage unit 130 is NAND flash memory, the third storage unit 151 can be an MRAM, a PCRAM, an ReRAM, an FeRAM or the like.

The fourth storage unit 153 is a nonvolatile memory having a higher access speed than the third storage unit 151 and a work area for the write process or the read process. Since the fourth storage unit 153 serves as a working memory for processes performed by the memory controller 120, the fourth storage unit 153 is desirably a memory that is as low in process cost as possible and also large. Furthermore, the fourth storage unit 153 is a nonvolatile memory so as to prevent loss of data being processed even when power is cut off during processing such as the write process or the read process (so as to guarantee the reliability thereof).

In the present embodiment, the third storage unit 151 and the fourth storage unit 153 are made of nonvolatile memories of the same type and provided on one substrate. That is, the third storage unit 151 and the fourth storage unit 153 are integrated on one chip, which simplifies the structure. Although memory blocks made of nonvolatile memories of the same type but having different speeds are usually not embedded together, such embedding of memory blocks made of the nonvolatile memories of the same type but having different speeds is realized in the present embodiment in a manner described below. Note that, in implementation, the storage capacity of the fourth storage unit 153 tends to be smaller than that of the third storage unit 151 because priority is placed on the access speed, but the present embodiment can be realized even in such a case. When nonvolatile memories of the same type are used, data bus lines in the memories are shared, and data transfer therein is therefore performed at a high speed.

When the nonvolatile memories are resistive switching memories, the resistance change ratio has a dominant influence on the reading speed in terms of reading. As the resistance change ratio is higher, signals are amplified at a higher speed by a read sense amplifier. As the resistance change ratio is higher, however, the difference between a high-resistance state and a low-resistance state will be larger, which is disadvantageous for writing. How the writing is designed is essential in the design of cells (memory cells) and peripheral circuits. Thus, measures to speed up the writing are examined on the basis of data write to a resistive switching memory. The memory holding time of a nonvolatile memory (the time during which memory cells can hold bit data) is dependent on the thermal stability of the memory cells. The thermal stability is in a trade-off relationship of the speed of writing to the memory cells. Accordingly, memory cells having lower writing speed have higher thermal stability and, on the contrary, memory cells having higher writing speed have lower thermal stability. In general, in the development of nonvolatile memories, the development of the materials and the structure of memory cells is promoted so as to solve the trade-off relationship at the same time. According to the trade-off relationship, an increase in the speed of writing to memory cells can be expected if the thermal stability, that is, the memory holding time is sacrificed. As a result, the allowable range of the resistance change is also increased for the design of reading, and operation can be performed at higher speed.

Specifically, in the present embodiment, a first memory holding time representing the time during which the memory cells of the fourth storage unit 153 can hold bit data is made shorter than a second memory holding time representing the time during which the memory cells of the third storage unit 151 can hold bit data by making the thermal stability of the memory cells of the fourth storage unit 153 lower than that of the memory cells of the third storage unit 151. As described above, the fourth storage unit 153 and the third storage unit 151 have memory cells of the same type, and the first storage holding time is shorter than the second storage holding time. As a result, embedding of memory blocks made of nonvolatile memories of the same type but having different speeds can be realized and the access speed of the fourth storage unit 153 can be made higher than that of the third storage unit 151. The thermal stability is controlled by, for example, a method of lowering the magnetic anisotropy energy of a magnetic material in a case of an MRAM. This is because the thermal stability coefficient is dependent on volume, magnetic anisotropy energy, and saturation magnetization. If the thermal stability coefficient is lowered from 40 to about 30, the memory holding time is lowered from ten years to one hour or shorter. As the trade-off therefor, the writing speed is lowered to 10 ns or lower. For example, in a case of an ReRAM, such a method as using an oxide allowing a conductive path to be formed easily in an insulating film.

Alternatively, the configuration may be such that the fourth storage unit 153 and the third storage unit 151 are made of nonvolatile memories of different types, for example. In other words, any configuration may be used as long as each of the third storage unit 151 and the fourth storage unit 153 has memory cells (which may be memory cells of the same type or of different types), the first memory holding time described above is shorter than the second memory holding time, and the access speed of the fourth storage unit 153 is higher than that of the third storage unit 151. Note that the "access speed" in the present embodiment refers to the reading/writing speed. The reading/writing speed can also be regarded as the time from when a storage unit receives a read/write request from a controller until when the storage unit returns a signal indicating completion of the request or requested data to the controller. For example, the reading/writing speed of the third storage unit 151 can be regarded as the time from when the third storage unit 151 receives a read/write request from the write control unit 141/read control unit 143 until when the third storage unit 151 returns a signal indicating completion of the request or requested data to the write control unit 141/read control unit 143. The same applies to the reading/writing speed of the fourth storage unit 153.

Next, the correcting unit 122 will be described. The correcting unit 122 performs an encoding process on data to be written in the writing process. The correcting unit 122 also performs an error correction process on data read from the first storage unit 130 by the reading process. In the present embodiment, the fourth storage unit 153 further has a work area for the encoding process performed by the correcting unit 122. The fourth storage unit 153 further has a work area for the error correction process performed by the correcting unit 122. Thus, the fourth storage unit 153 functions as a working memory for the encoding process and the error correction process performed by the correcting unit 122.

The updating unit 123 updates the logical-to-physical translation information described above. In the present embodiment, the updating unit 123 updates the logical-to-physical translation table stored in the first storage unit 130. More specifically, each time a write process is completed, the updating unit 123 adds a physical address of data written into the first storage unit 130 by the write process and a logical address (a logical address associated with the data) specified by the host device 200 in association with each other into the logical-to-physical translation table.

In the present embodiment, each time a write process or a read process is performed, data to be saved containing the processed data and a logical address in association with each other are stored in the fourth storage unit 153. Thus, the fourth storage unit 153 further has an area for storing the data to be saved. The managing unit 124 manages the saved data stored in the fourth storage unit 153 according to the capacity of the fourth storage unit 153. For example, when the volume of accumulated saved data exceeds the capacity of the fourth storage unit 153, the managing unit 124 deletes the saved data starting from the oldest data from the fourth storage unit 153. This is also called FIFO (first-in-first-out). Alternatively, the managing unit 124 may also leave frequently-used saved data among the saved data in the fourth storage unit 153 without deleting the frequently-used data and store a duplicate (copy) thereof in the third storage unit 151, for example. Furthermore, when the volume of accumulated saved data exceeds the capacity of the fourth storage unit 153, the managing unit 124 may also use an algorithm called an LRU (least recently used) algorithm for storing saved data that is unused for the longest time among the saved data stored in the fourth storage unit 153 into the third storage unit 151, for example. Alternatively, when the third storage unit 151 has enough capacity, the managing unit 124 may also store all the saved data stored in the fourth storage unit 153 into the third storage unit 151, for example. Thus, the third storage unit 151 further has an area for storing a duplicate of at least a piece of saved data among the saved data stored in the fourth storage unit 153.

In the present embodiment, the functions of the receiving unit 121, the access controller 140 (the write control unit 141 and the read control unit 143), the correcting unit 122, the updating unit 123, and the managing unit 124 described above are implemented by dedicated hardware circuits; however, the configuration is not limited thereto and may be such that a computer including a CPU, a ROM, a RAM, and the like is mounted in the memory controller 120 and at least part of the functions of the receiving unit 121, the access controller 140 (the write control unit 141 and the read control unit 143), the correcting unit 122, the updating unit 123, and the managing unit 124 described above are implemented by expanding and executing programs stored in the ROM or the like in the RAM by the CPU. Note that, while the device 100 is regarded as a "semiconductor memory device" in the claims herein, the memory controller 120, for example, may be regarded as the "semiconductor memory device" in the claims.

Figure 3:
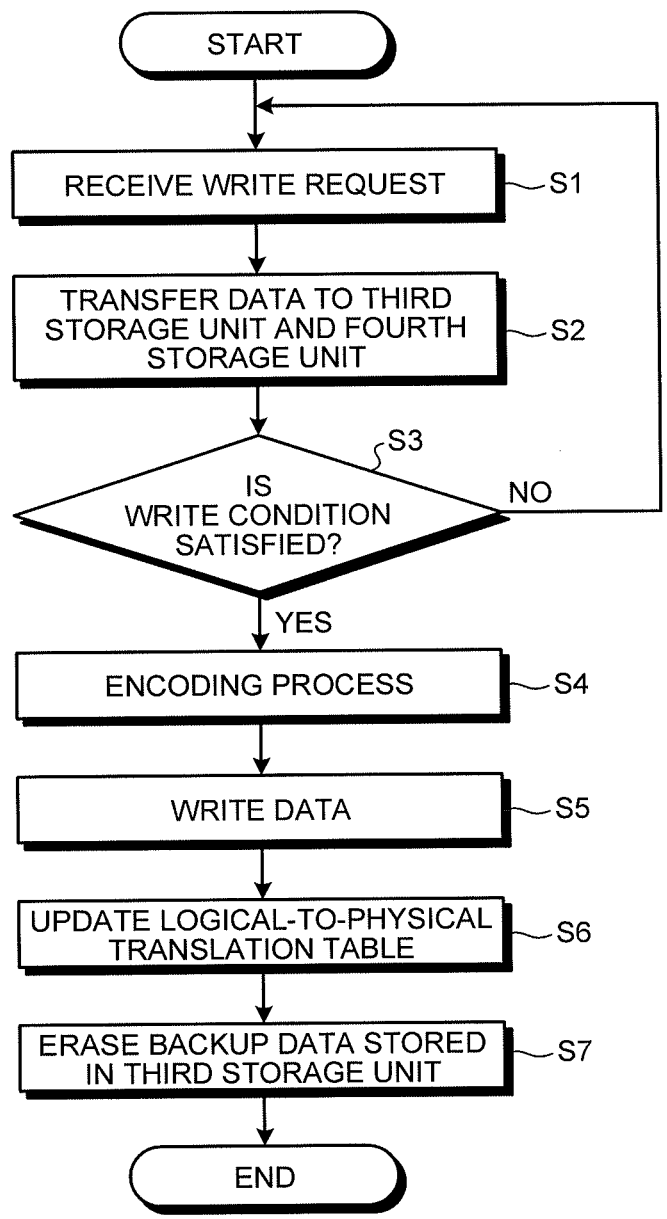
FIG. 3 is a flowchart illustrating an example of a write process according to the first embodiment.

Next, specific details of the write process performed by the memory controller 120 when a write request is received from the device controller 110 will be described. FIG. 3 is a flowchart illustrating an example of the write process. As illustrated in FIG. 3, the receiving unit 121 first receives a write request from the device controller 110 (step S1). Subsequently, the write control unit 141 transfers data contained in the write request received in step S1 to each of the third storage unit 151 and the fourth storage unit 153 (step S2). More specifically, the write control unit 141 transfers the data and a logical address contained in the write request received in step S1 to the fourth storage unit 153, and transfers data (referred to as "backup data") that is a duplicate of the data and the logical address contained in the write request to the third storage unit 151. Subsequently, the write control unit 141 determines whether or not a write condition is satisfied (step S3). For example, the write control unit 141 may determine that the write condition is not satisfied if the size of data to be written by the write process is smaller than the unit size (such as a page size) for writing. Note that the write condition is not limited thereto but can be changed as appropriate.

If it is determined that the write condition is not satisfied in step S3 described above (result of step S3: NO), the write control unit 141 returns information indicating that the data contained in the received write request are held by the third storage unit 151 but have not been written to the first storage unit 130 to the device controller 110, and waits for a next write request.

If, on the other hand, it is determined that the write condition is satisfied in step S3 described above (result of step S3: YES), the process proceeds to step S4. In step S4, the correcting unit 122 performs the encoding process on data held by the fourth storage unit 153 and to be written by the write process. More specifically, the correcting unit 122 performs, on the data to be written by the write process, a process of adding redundant data (referred to as parity when the parity of data bits is utilized) for performing an error correction process (ECC process) of bits.

After step S4 described above, the write control unit 141 performs control to write the data encoded by the correcting unit 122 into an empty area in the first storage unit 130 (step S5). After writing of the data (writing of the encoded data) is completed, the first storage unit 130 transmits a write termination notice indicating that writing of data is terminated to the memory controller 120. When the write termination notice is received, the updating unit 123 updates the logical-to-physical translation table (step S6). More specifically, the updating unit 123 adds the logical address of the data written into the first storage unit 130 by the write process and a physical address indicating the place in the first storage unit 130 where the data are written in association with each other into the logical-to-physical translation table.

After step S6 described above, the write control unit 141 erases the backup data stored in the third storage unit 151 (step S7). Note that the managing unit 124 stores the saved data containing the data and the logical address contained in the write request received in step S1 described above in association with each other into the fourth storage unit 153. The managing unit 124 manages the saved data to be stored in the fourth storage unit 153 according to the capacity of the fourth storage unit 153.

As described above, in the present embodiment, the fourth storage unit 153 that is increased in access speed by sacrificing nonvolatility is used as a work area (working memory) for the write process and the third storage unit 151 that is increased in nonvolatility by sacrificing access speed is used as a memory for backup holding a duplicate of data to be written by the write process. As a result, even if power is cut off during the write process, it is possible to prevent writing performance from lowering while ensuring that data to be written by the write process are prevented from being lost.

A configuration in which a memory that is increased in nonvolatility by sacrificing access speed is used as a work area for the write process is assumed as a comparative example. With this comparative example, although it is possible to ensure that data to be written by the write process is prevented from being lost even if power is cut off during the write process, there is a problem that sufficient processing speed cannot be achieved and writing performance is lowered since the memory increased in nonvolatility by sacrificing access speed is used as a working memory.

In contrast, with the present embodiment, since the fourth storage unit 153 that is increased in access speed by sacrificing nonvolatility is used as a working memory for the write process, a sufficiently high processing speed as compared to the comparative example can be achieved and writing performance can be prevented from lowering. Since, however, the fourth storage unit 153 is not sufficient in nonvolatility, the third storage unit 151 that is increased in nonvolatility by sacrificing access speed is provided separately in addition to the fourth storage unit 153 and the third storage unit 151 is used as a backup memory for holding a duplicate of the data to be written by the write process, which can ensure that data are prevented from being lost when power is cut off. Thus, the present embodiment can produce an advantageous effect, which cannot be produced by the comparative example, that it is possible to ensure that data to be written by the write process are prevented from being lost even if power is cut off during the write process and also to prevent writing performance from lowering.

Figure 4:
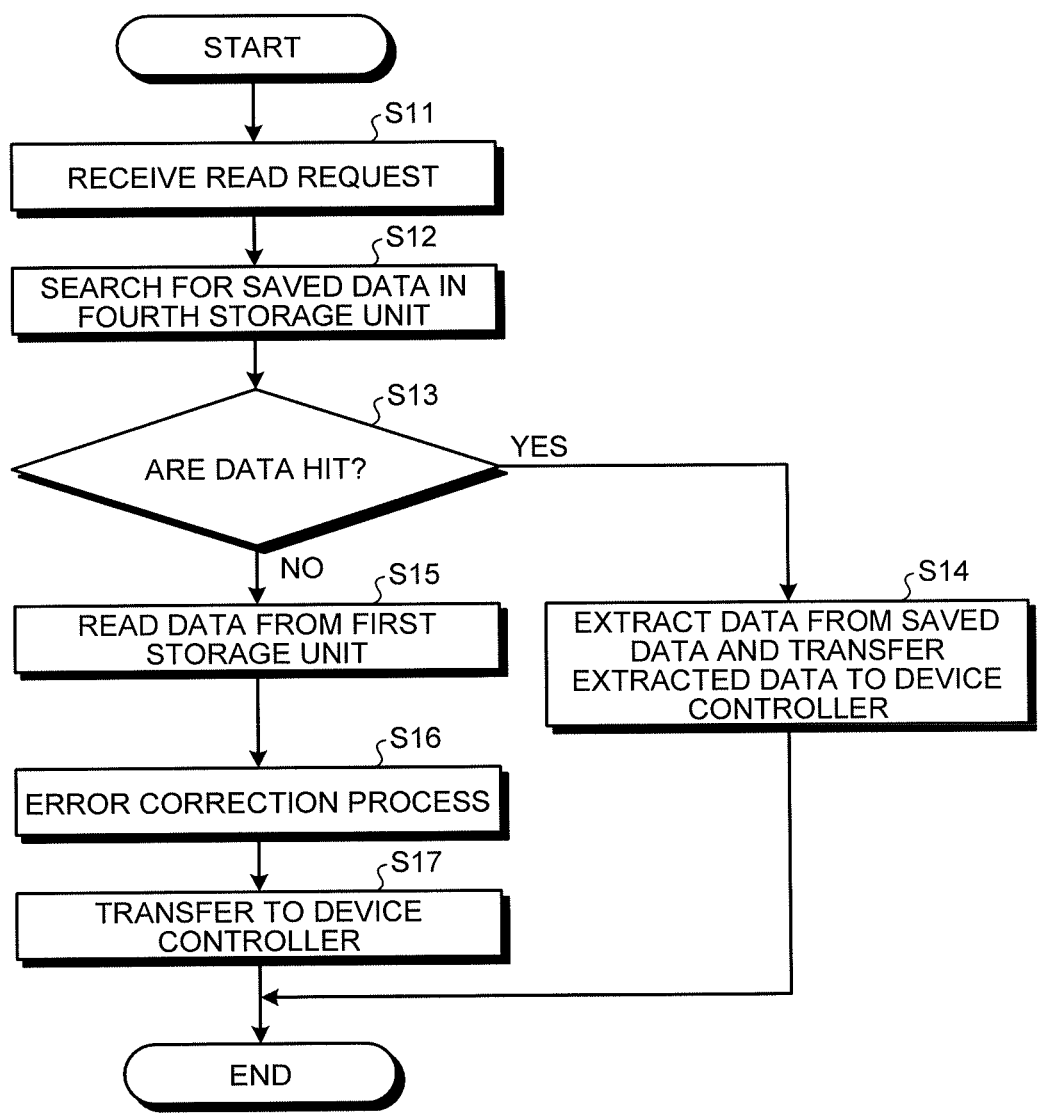
FIG. 4 is a flowchart illustrating an example of a read process according to the first embodiment.

Next, specific details of the read process performed by the memory controller 120 when a read request is received from the device controller 110 will be described. FIG. 4 is a flowchart illustrating an example of the read process. First, the receiving unit 121 receives a read request from the device controller 110 (step S11). Next, the read control unit 143 performs a search to determine whether or not saved data that match with a logical address contained in the read request received in step S11 are present in the fourth storage unit 153 (step S12). If saved data that match with the logical address contained in the read request are present in the fourth storage unit 153 (result of step S13: YES), the read control unit 143 extracts data contained in the saved data that match with the logical address contained in the read request, and transfers the extracted data to the device controller 110 (step S14).

If, on the other hand, saved data that match with the logical address contained in the read request are not present in the fourth storage unit 153 (result of step S13: NO), the read control unit 143 performs control to read out data associated with the logical address (data specified by the logical address) from the first storage unit 130 (step S15). The reading itself follows typical procedures. In the present embodiment, the read control unit 143 refers to the logical-to-physical translation table stored in the first storage unit 130 to identify the physical address associated with the logical address (performs logical-to-physical translation), and transmits a command instructing to read data stored at the identified physical address to the first storage unit 130. The read control unit 143 then receives the data read according to the command from the first storage unit 130. The data received from the first storage unit 130 are transferred to the fourth storage unit 153 and stored therein.

At the same time as the storage of the data read from the first storage unit 130 into the fourth storage unit 153, the correcting unit 122 performs the error correction process (ECC process) on the data read from the first storage unit 130 (step S16). In the present embodiment, the fourth storage unit 153 functions as a work area (working memory) for the ECC process performed by the correcting unit 122. More specifically, intermediate data of the ECC process are stored in the fourth storage unit 153, the error correcting unit 122 proceeds with the error correction process on the read data by updating the intermediate data in the fourth storage unit 153 each time calculation for error correction is performed. Furthermore, in the present embodiment, the ECC process performed by the correcting unit 122 also includes a data decoding process in which the error-corrected data are decoded by the decoding process. Examples of the ECC method used by the correcting unit 122 include BCH, Reed-Solomon, LDPC, and turbo codes, but the method is not limited thereto. Basically, any method for performing an error correction process on data obtained by embedding redundant data for the error correction process as systematic codes or non-systematic codes into original data may be used. While a systematic code has a simple structure in which parity is added to original data, a non-systematic code has a complicated structure in which parity is embedded into the entire original data. In the ECC, correction capability and complexity of codewords are correlated, and the amount of operation for the correction process increases so as to obtain high correction capability. Accordingly, the amount of operation information indicating results of operation during the correction process is increased, but it is possible to prevent the operation information from being lost during the correction process and to reduce delay in processing speed by using the fourth storage unit 153 as a working memory for the correction process.

When the ECC process described above is completed, the correcting unit 122 informs the read control unit 143 of the completion of the ECC process. The read control unit 143 transfers the data resulting from the ECC process (error-corrected and decoded data) together with a read completion notice to the device controller 110 (step S17). In the present embodiment, the read control unit 143 transmits the read completion notice to the device controller 110 and transmits the data resulting from the ECC process to a buffer managed by the device controller 110. Note that the managing unit 124 stores the saved data containing the logical address contained in the read request received in step S11 described above and the data resulting from the ECC process in step S16 in association with each other into the fourth storage unit 153. The managing unit 124 manages the saved data to be stored in the fourth storage unit 153 according to the capacity of the fourth storage unit 153.

As described above, in the present embodiment, since the fourth storage unit 153 that is a work area for the read process is a nonvolatile memory increased in access speed, it is possible to reduce the delay in processing speed while preventing data being read from being lost even if power is cut off. In addition, in the present embodiment, since the history of the saved data are held by the fourth storage unit 153, data can be read out without accessing the first storage unit 130 when saved data that match with a logical address contained in a read request from the host device 200 are present in the fourth storage unit 153. Furthermore, a duplicate (copy) of the saved data stored in the fourth storage unit 153 may be stored in the third storage unit 151 that is increased in nonvolatility as compared to the fourth storage unit 153. As a result, it is possible to ensure that the saved data are prevented from being lost even if power is cut off. If the capacity of the third storage unit 151 is limited, for example, the configuration may be such that frequently-used saved data among the saved data stored in the fourth storage unit 153 are stored in the third storage unit 151. Basically, any configuration may be used as long as the fourth storage unit 153 that functions as a nonvolatile cache stores saved data representing data on which the write process or the read process is performed and the third storage unit 151 that functions as a backup memory for cache data (saved data) saves at least one piece of saved data among the saved data stored in the fourth storage unit 153.

Modification 1 of First Embodiment

The logical-to-physical translation table is stored in the first storage unit 130 in the first embodiment described above, but the place where the logical-to-physical translation table is not limited thereto and may be any place. For example, the logical-to-physical translation table may be stored in the second storage unit 150. In this case, the configuration may be such that the entire logical-to-physical translation table is stored in the third storage unit 151, for example. With this configuration, it is not necessary to access the fourth storage unit 153 for identifying the physical address associated with the logical address contained in the read request (for performing logical-to-physical translation), for example.

Alternatively, the configuration may be such that most of the logical-to-physical translation table is stored in the fourth storage unit 153 while a difference table indicating a difference from a previously updated logical-to-physical translation table as update history of the logical-to-physical translation table is stored in the third storage unit 151, for example. With this configuration, for reading out the logical-to-physical translation table in order to identify the physical address associated with the logical address contained in a read request from the host device 200, for example, the read control unit 143 first accesses the third storage unit 151 to read information (update information) in the difference table. Subsequently, the read control unit 143 can also access the fourth storage unit 153 and read out information (table information) in the logical-to-physical translation table itself to obtain information on the entire logical-to-physical translation table from the update information and the table information.

With the configuration in which the logical-to-physical translation table is stored in the second storage unit 150 and the memory controller 120 performs logical-to-physical translation, the read control unit 143 can obtain the logical-to-physical translation table and identify the physical address associated with the logical address contained in a read request (perform logical-to-physical translation) as described above.

Modification 2 of First Embodiment

The memory controller 120 performs logical-to-physical translation table and updates the logical-to-physical translation table with the configuration described above, but the configuration is not limited thereto and may be such that the device controller 110 performs logical-to-physical translation and updates the logical-to-physical translation table, for example. A case in which the device controller 110 receives a read request from the host device 200 with this configuration is assumed in the description below. In this case, the device controller 110 refers to the logical-to-physical translation table to identify the physical address associated with the logical address contained in the read request. The device controller 110 then transmits the identified physical address and a command instructing to read out data stored in a place indicated by the physical address as information to be transmitted to the memory controller 120 to the memory controller 120. Note that the logical-to-physical translation table may be stored anywhere, and the configuration may be such that the device controller 110 holds the logical-to-physical translation table, for example.

With this configuration, the fourth storage unit 153 can also further have an area for storing saved data containing the data on which the write process or the read process is performed and the logical address in association with each other. When the information transmitted from the device controller 110 is received by the receiving unit 121, the read control unit 143 refers to a P2L table that is a reverse lookup table (a table allowing logical address associated with a physical address to be identified from the physical address) of the logical-to-physical translation table to identify the logical address associated with the physical address contained in the information transmitted from the device controller 110, and performs a search to determine whether or not saved data that match with the identified logical address are present in the fourth storage unit 153. The P2L table may be stored in any place such as in the second storage unit 150, in the first storage unit 130, or in a buffer included in the device controller 110. In terms of accelerating the processing, the P2L table is preferably held by the memory controller 120 (the second storage unit 150, for example). If saved data that match with the identified logical address are present in the fourth storage unit 153, the read control unit 143 extracts data contained in the saved data and transfers the extracted data to the device controller 110. If, on the other hand, saved data that match with the identified logical address are not present in the fourth storage unit 153, the read control unit 143 accesses the first storage unit 130 by using the physical address contained in the information transmitted from the device controller 110 and performs control to read out data stored in a place indicated by the physical address. The read control unit 143 also refers to the P2L table to identify the logical address associated with the physical address contained in the information transmitted from the device controller 110. The data read from the first storage unit 130 are subjected to the ECC process performed by the correcting unit 122, then associated with the logical address identified by reference to the P2L table, and stored as saved data in the fourth storage unit 153.

The fourth storage unit 153 can also further have an area for storing information containing the data on which the write process or the read process is performed and the physical address in association with each other as saved data, for example. In this case, the read control unit 143 performs a search to determine whether or not saved data that match with the physical address contained in the information transmitted from the device controller 110 are present in the fourth storage unit 153. If saved data that match with the physical address contained in the transmitted information are present in the fourth storage unit 153, the read control unit 143 extracts data contained in the saved data and transfers the extracted data to the device controller 110. If, on the other hand, saved data that match with the physical address contained in the transmitted information are not present in the fourth storage unit 153, the read control unit 143 accesses the first storage unit 130 by using the physical address and performs control to read out data stored in a place indicated by the physical address. The read data are subjected to the ECC process performed by the correcting unit 122, then associated with the physical address contained in the transmitted information, and stored as saved data in the fourth storage unit 153.

Second Embodiment

Next, a second embodiment will be described. Parts that are the same as those in the first embodiment described above will be designated by the same reference numerals and description thereof will not be repeated as appropriate. A semiconductor memory device according to the second embodiment has a search function in addition to the write/read functions described in the first embodiment. In order to enhance the search function, it is assumed that the device controller adds additional information such as a tag (an example of "key") that is metadata to data supplied from the host device in performing writing. The search scheme and method will be described below before description of the semiconductor memory device according to the second embodiment.

For effectively retrieving data such as a text associated with another text, a specific bit pattern in a binary file, a specific pattern in a video file and a distinctive audio pattern in an audio file that are stored in a semiconductor memory device, a data read function specifying data is desired. Accordingly, a method of storing data with metadata associated therewith in advance and referring to the metadata so as to obtain desired data is used. One method for managing metadata is a key-value store (KVS) in which data have one-to-one or one-to-many relationships. In the KVS, when a key is supplied as a search request, a value associated therewith is then output.

The semiconductor memory device in the second embodiment processes KVS data (key-value information) efficiently and at a high speed by using an address translation table. This address translation table is referred to as a K2P table that is a translation table between fixed-length addresses (key addresses) obtained from keys and physical addresses. A specific example of processing for retrieving KVS data will be described below. In general, the KVS refers to a database management technique in which sets of keys and values are written allowing a value to be read out by specifying a key. In general, the KVS is often used over a network. There is no doubt that the storage of data is a certain local memory or a certain storage system.

Data are usually read by specifying the top address of the memory in which the data are stored and the data length. Data addresses are managed in units of a 512-byte sector, for example, by an OS or a file system of a host system. Alternatively, if the file system need not be limited, data addresses may be managed in units of 4-KB or 8-KB in conformity with the read/write page size of the NAND flash memory, for example.

Most simple search procedures are as the following (1) to (3).
(1) Convert a key to a fixed-length data by a hash function or the like and translate the fixed-length data to an address of an available memory to obtain a fixed-length address. Set the fixed-length address resulting from the translation to a key address.
(2) Refer to a K2P table saved in NAND flash memory to obtain a physical address.
(3) Read data at the physical address and output the read data to outside of the memory system.

Such relationships between real data addresses and KVS data and relationships between keys and values correspond to relationships between elements and sets. Specifically, in a typical file, when a file with a file name of "a-file.txt" is a set and there are text data of "This is a book" in the file, for example, each word thereof is an element.

In the case of key/value, when placed in a metadata address space, the relationships between sets and elements are reversed and rearranged. That is, the relationships may be converted to "inverted" relationships and saved. For example, in a set of "book", file names of "a-file.txt" and "b-file.txt" are saved as elements. In the case of key/value, the rearranged set name ("book") is searched for and elements ("a-file.txt", "b-file.txt") thereof are requested. These are practically procedures of creation of inverted files and search typically performed in full-text search, and can be said to be one practical example of key/value.

For manufacturing a searcher and storage in the KVS method using K2P as described above, it is desirable to provide a nonvolatile buffer memory for storage in response to a search request. Furthermore, since the K2P table is read out from the NAND flash memory and expanded in the buffer memory, the buffer memory is desirably nonvolatile so as to be ready for sudden power cut-off. In practice, it is rare that the number of search requests is one but a plurality of search results are processed in a device. It is thus desirable to provide a high-speed nonvolatile buffer memory for efficiently performing search operation, that is, set operation such as AND, OR, or NOT. Since a search request must certainly be saved in the nonvolatile buffer until data processing is completed, a nonvolatile memory having long-term reliability is desirable. Since, on the other hand, data being subjected to data processing only have to be prevented from being lost when sudden power cut-off occurs during the processing, there is no problem in practical use even the data holding time of the buffer memory is short. For example, long-term reliability refers to 10-year guarantee while short data holding time refers to holding of data for several days to several weeks. Speaking in an extreme manner, nonvolatility for only several hours may be sufficient if power supply is restarted immediately in some use cases.

Figure 5:
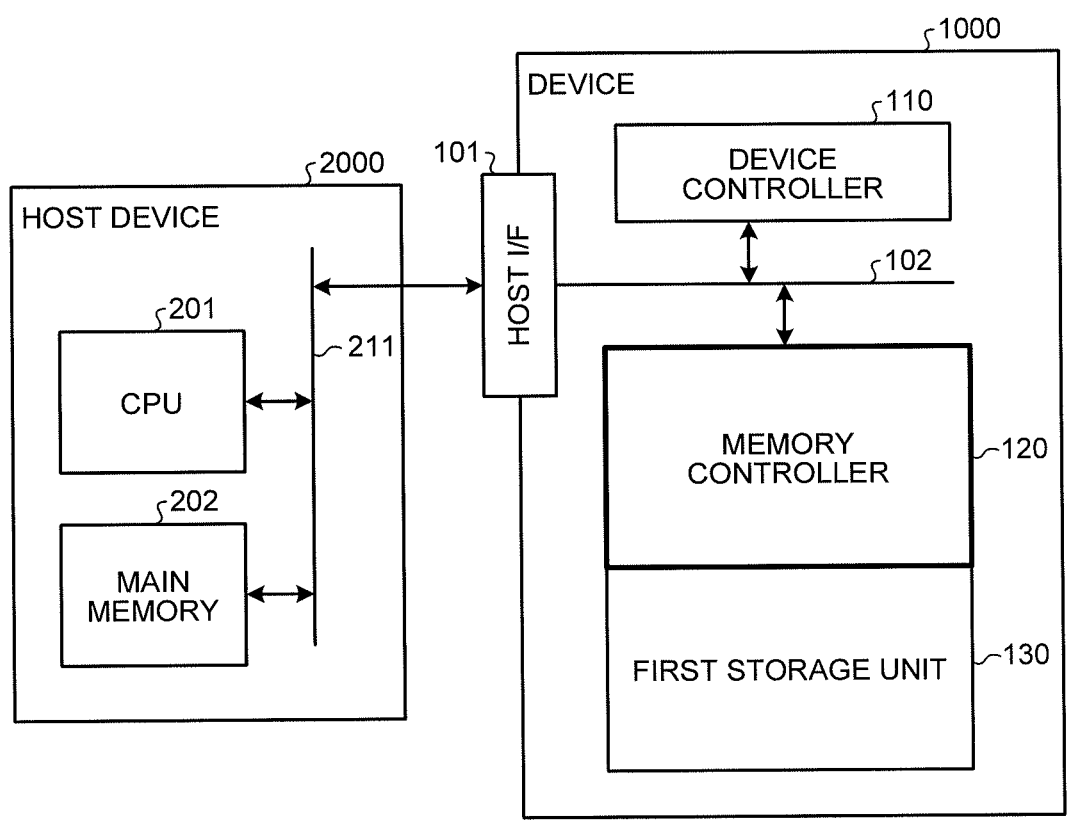
FIG. 5 is an exemplary hardware configuration of a semiconductor memory device according to a second embodiment.

Specific details of the semiconductor memory device according to the second embodiment will be described below. FIG. 5 is a block diagram illustrating an example of hardware configurations of a device 1000 that is a semiconductor memory device and a host device 2000 according to the second embodiment. The host interface 101 receives a search request requesting to search for data associated with a specified key from the host device 2000. In this example, the search request contains a search command instructing to conduct a search and a key.

The device controller 110 interprets the search request received by the host interface 101, determines information to be transmitted to the memory controller 120, and transmits the information to the memory controller 120. In the present embodiment, the device controller 110 converts the key contained in the search request received by the host interface 101 into fixed-length data by using a hash function or the like, and translates the fixed-length data to an address of an available memory to obtain a key address. The device controller 110 then transmits the key address and the search command as information (referred to as "search information" in this example) to be transmitted to the memory controller 120 to the memory controller 120. When a set operation condition (operation condition such as AND or OR) for narrowing search results together with a plurality of search requests are received from the host device 2000, the device controller 110 also transmits the received set operation condition to the memory controller 120. The device controller 110 converts a key contained in a search request into a key address in the present embodiment, but the configuration is not limited thereto and may be such that the memory controller 120 performs the conversion to a key address, for example.

Figure 6:
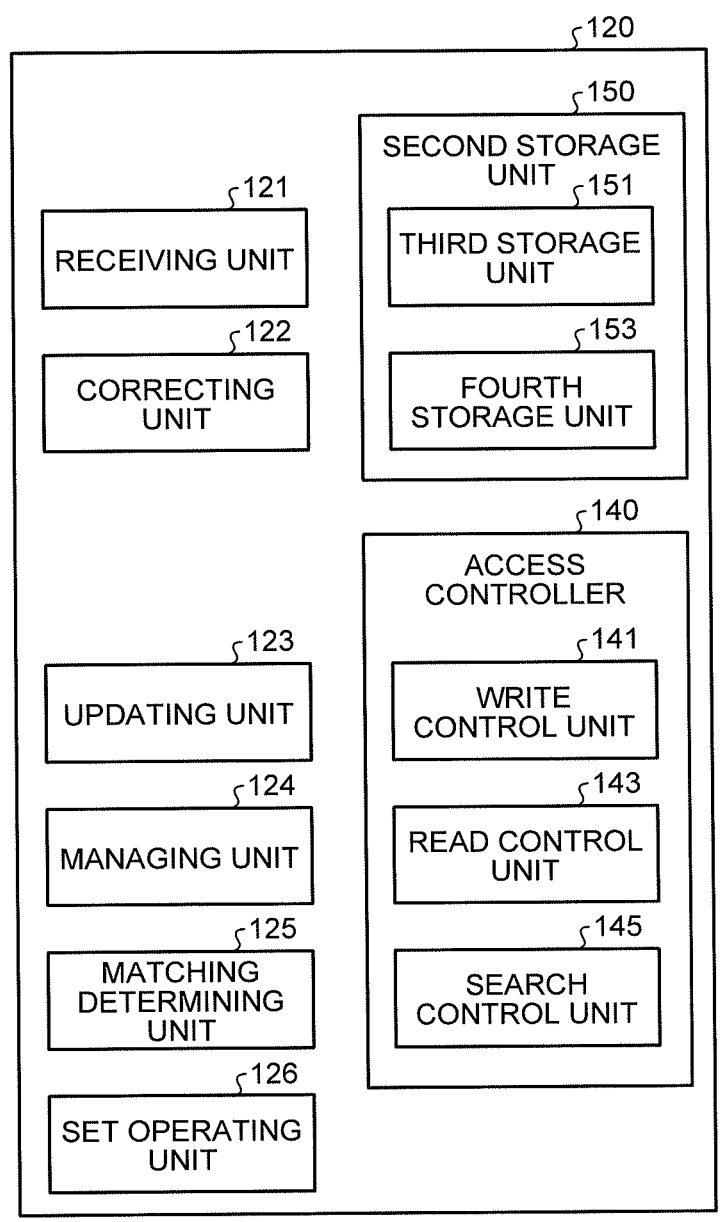
FIG. 6 is a diagram illustrating an exemplary functional configuration of a memory controller according to the second embodiment.

The memory controller 120 performs a search process of searching for data associated with the key contained in the search request from the host device 2000 according to the search information and the set operation condition received from the device controller 110. FIG. 6 is a block diagram illustrating an exemplary functional configuration of the memory controller 120 according to the second embodiment. The receiving unit 121 receives search information transmitted from the device controller 110. As described above, the search information is information containing a search command and a key address. The receiving unit 121 can also receive a set operation condition (such as AND or OR) transmitted from the device controller 110.

The access controller 140 further includes a search control unit 145 in addition to the write control unit 141 and the read control unit 143. The search control unit 145 controls the search process according to the search information and the set operation condition received by the receiving unit 121.

The fourth storage unit 153 further has a work area (working memory) for the search process. The fourth storage unit 153 further has an area for storing second saved data representing data searched for by the search process. More specifically, the second saved data contains the data searched for by the search process and a key address in association with each other, and the fourth storage unit 153 further has an area for storing one or more pieces of second saved data. The managing unit 124 manages the second saved data in the fourth storage unit 153 according to the capacity of the fourth storage unit 153. For example, when the volume of accumulated second saved data exceeds the capacity of the fourth storage unit 153, the managing unit 124 may delete the second saved data starting from the oldest data from the fourth storage unit 153. Alternatively, the managing unit 124 may also leave frequently-used second saved data among the second saved data in the fourth storage unit 153 without deleting the frequently-used data and store a duplicate (copy) thereof in the third storage unit 151, for example. Furthermore, when the volume of accumulated second saved data exceeds the capacity of the fourth storage unit 153, the managing unit 124 may also use an algorithm called an LRU (least recently used) algorithm for storing second saved data that is unused for the longest time among the second saved data stored in the fourth storage unit 153 into the third storage unit 151, for example. Alternatively, when the third storage unit 151 has enough capacity, the managing unit 124 may also store all the second saved data stored in the fourth storage unit 153 into the third storage unit 151, for example.

The third storage unit 151 further has an area for storing at least a piece of second saved data among the second saved data stored in the fourth storage unit 153. In practical use, the third storage unit 151 stores information such as program codes, boot information, and system parameters of the search control unit 145.

A matching determining unit 125 determines whether or not second saved data that match with the key address contained in the search information received by the receiving unit 121 are present in the fourth storage unit 153. A set operating unit 126 performs set operation according to the set operation condition received by the receiving unit 121.

While the K2P table described above is stored in the first storage unit 130 in the present embodiment, the place where the K2P table is stored is not limited thereto and may be any place. For example, the K2P table may be stored in the third storage unit 151 and the fourth storage unit 153 or may be stored in a buffer included in the device controller 110.

Figure 7:
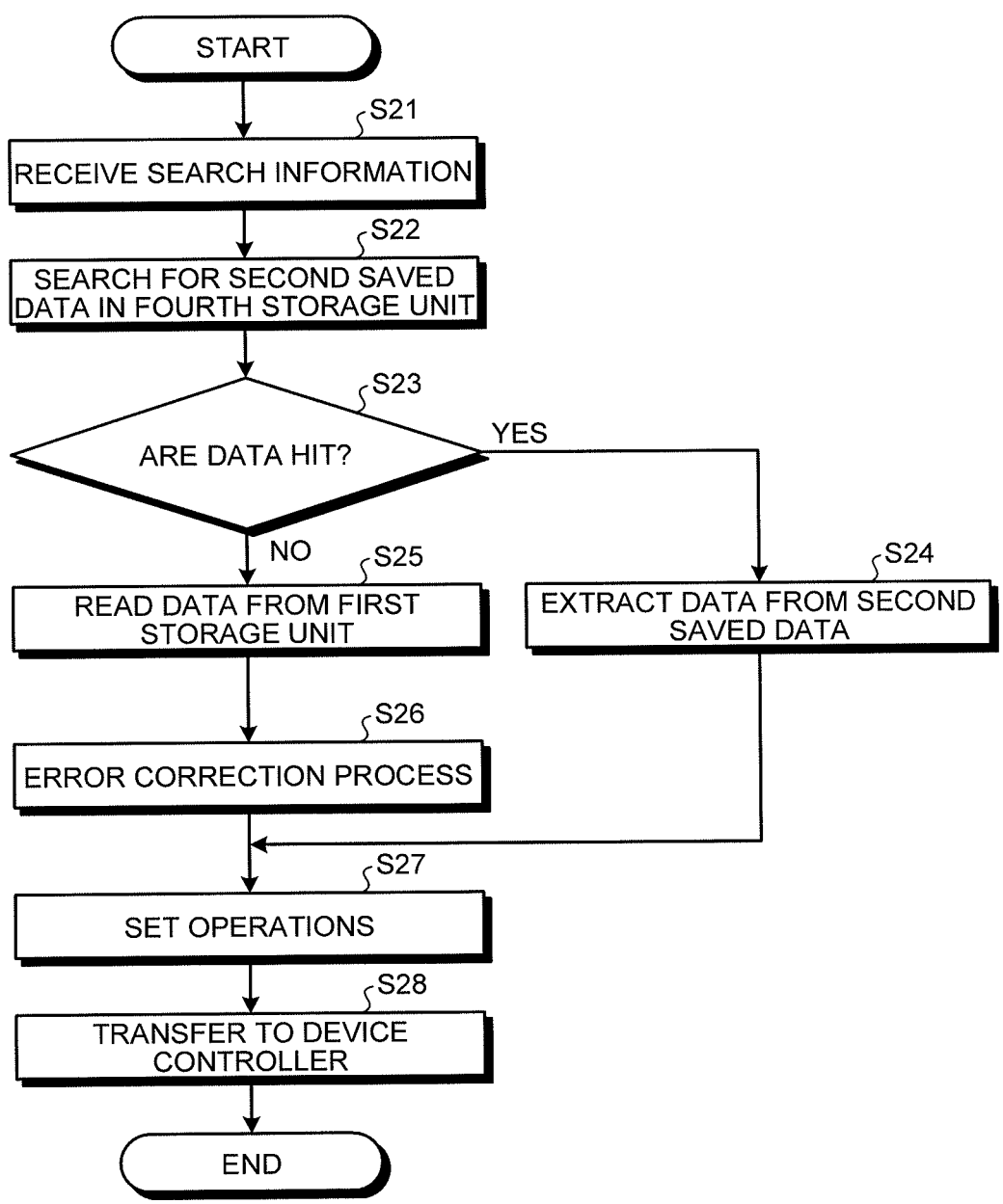
FIG. 7 is a flowchart illustrating an example of a search process according to the second embodiment.

Next, specific details of the search process performed by the memory controller 120 will be described. FIG. 7 is a flowchart illustrating an example of the search process. First, the receiving unit 121 receives search information from the device controller 110 (step S21). Subsequently, the search control unit 145 performs a search to determine whether or not second saved data that match with a key address contained in the search information received in step S21 are present in the fourth storage unit 153 (step S22). If second saved data that match with the key address contained in the search information are present in the fourth storage unit 153 (result of step S23: YES), the search control unit 145 extracts data contained in the second saved data that match with the key address contained in the search information (step S24). If no set operation condition is received by the receiving unit 121 (that is, in a case of a single search request), the search control unit 145 transfers the data extracted in step S24 to the device controller 110 and terminates the process. In this case, however, it is assumed that a set operation condition for narrowing search results together with a plurality of search requests are received in step S21, the process proceeds to step S27 described below.

If, on the other hand, no second saved data that match with the key address contained in the search information are present in the fourth storage unit 153 (result of step S23: NO), the search control unit 145 performs control to read out data associated with the key address from the first storage unit 130 (step S25). The search follows typical procedures. In the present embodiment, the search control unit 145 refers to the K2P table stored in the first storage unit 130 to identify the physical address associated with the key address contained in the search information, and transmits a command instructing to read data stored at the identified physical address to the first storage unit 130. The search control unit 145 then receives the data read according to the command from the first storage unit 130. The data received from the first storage unit 130 are transferred to the fourth storage unit 153 and stored therein.

At the same time as the storage of the data read from the first storage unit 130 into the fourth storage unit 153, the correcting unit 122 performs the error correction process (ECC process) on the data read from the first storage unit 130 (step S26). The data resulting from the ECC process performed by the correcting unit 122 are held by the fourth storage unit 153. In this manner, each time search information is received by the receiving unit 121, data associated with a key address contained in the received search information are searched for and held by the fourth storage unit 153. In the present embodiment, the key address contained in the search information received by the receiving unit 121 and data (searched data) are associated with each other and held as second saved data by the fourth storage unit 153. The set operating unit 126 then performs set operation on a set of data associated with the key addresses respectively contained in a plurality of search conditions according to the set operation condition received by the receiving unit 121 (step S27).

For example, when a specified key is "book" and elements ("a-file.txt", "b-file.txt") in a set named "book" are found as data associated with this "book", only these may be transmitted to the device controller 110 as a search result, but in practice, it is common to conduct searches other than that for "book" and perform set operation such as AND, OR, or NOT on a plurality of search results. For example, it is assumed that data associated with a key named "This" are searched for and that elements ("a-file.txt", "c-file.txt", "d-file.txt") in a set named "This" are found. If AND of the set "book" and the set "This" is calculated, "a-file.txt" will be obtained as a search result. In fact, it is possible to confirm that the targeted search is successfully conducted by reading out "a-file.txt" since the content thereof is "This is a book". OR and NOT also refer to typical set operation.

If such set operation is performed outside of the device 1000 (by the host device 2000, for example), all of a large volume of search results may be transmitted to the host device 2000, which will make the traffic of communication between the host device 2000 and the device 1000 busy and consume the capacity of a main memory (DRAM, etc.) in the host device 2000. It is therefore desirable to perform the set operation as described above in the device 1000 as much as possible. Moreover, it is desirable to perform the set operation as described above by using the fourth storage unit 153 in the memory controller 120 as a work area. This is because the time for the set operation as described above is known to simply increase as the total amount of data stored in the first storage unit 130 increases, and the buffer for storing intermediate data for the set operation is required to be high-speed so as to sequentially process a large amount of data. Furthermore, the time of the set operation is different from the usual read time and the following relation is satisfied where the data amount is represented by n: calculation time=$n^2$. Thus, since the processing time that is several orders of magnitude longer than the read time is required, it is required that nonvolatility of stored data be guaranteed in terms of system availability.

In the present embodiment, since the fourth storage unit 153 that is a work area for the search process described above is a nonvolatile memory increased in access speed, it is possible to reduce the delay in processing speed while preventing data being subject to the search process from being lost even if power is cut off. In addition, in the present embodiment, since the history of the second saved data are held by the fourth storage unit 153, data can be read out without accessing the first storage unit 130 when second saved data that match with a key address contained in a search request from the host device 2000 are present in the fourth storage unit 153. Furthermore, a duplicate (copy) of the second saved data stored in the fourth storage unit 153 may be stored in the third storage unit 151 that is increased in nonvolatility as compared to the fourth storage unit 153. As a result, it is possible to ensure that the second saved data are prevented from being lost even if power is cut off. If the capacity of the third storage unit 151 is limited, for example, the configuration may be such that frequently-used second saved data among the second saved data stored in the fourth storage unit 153 are stored in the third storage unit 151. Basically, any configuration may be used as long as the fourth storage unit 153 that functions as a nonvolatile cache stores second saved data representing data searched for by the search process and the third storage unit 151 that functions as a backup memory for cache data (second saved data) saves at least one piece of second saved data among the saved data stored in the fourth storage unit 153.

After step S27 described above, the search control unit 145 transfers the search result obtained as a result of the set operation to the device controller 110 (step S28).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:
   a controller configured to control a write process of writing data into a first storage storing data supplied from a host device or a read process of reading the data stored in the first storage in response to a request from the host device; and
   a second storage unit temporarily used in the write process or the read process, wherein
   the second storage unit includes
      a nonvolatile third storage unit having an area for storing a duplicate of the data to be written by the write process; and
      a nonvolatile fourth storage unit having a work area for the write process or the read process and having a higher read/write speed than the third storage unit,
   wherein
   each of the fourth storage unit and the third storage unit has memory cells, and
   a first memory holding time that represents time for which the memory cells of the fourth storage unit allow bit data to be held is shorter than a second memory holding time that represents time for which the memory cells of the third storage unit allow bit data to be held.

2. The semiconductor memory device according to claim 1, wherein
the fourth storage unit further has an area for storing saved data representing the data on which the write process or the read process is performed, and
the third storage unit further has an area for storing a duplicate of at least one piece of saved data among the saved data stored in the fourth storage unit.

3. The semiconductor memory device according to claim 2, further comprising a managing unit configured to manage the saved data stored in the fourth storage unit.

4. The semiconductor memory device according to claim 3, wherein
when an accumulation volume of the saved data exceeds a capacity of the fourth storage unit, the managing unit deletes the saved data starting from oldest data from the fourth storage unit.

5. The semiconductor memory device according to claim 4, wherein
the managing unit does not delete frequently-used save data among the save data.

6. The semiconductor memory device according to claim 3, wherein
the managing unit stores a copy of frequently-used save data among the saved data into the third storage unit.

7. The semiconductor memory device according to claim 3, wherein
when an accumulation volume of the saved data exceeds a capacity of the fourth storage unit, the managing unit stores, among the saved data stored in the fourth storage unit, save data that is unused for longest time into the third storage unit.

8. The semiconductor memory device according to claim 1, further comprising a correcting unit configured to perform an error correction process on the data read from the first storage unit by the read process, wherein
the fourth storage unit further has a first work area for the error correction process.

9. The semiconductor device according to claim 8, wherein
the correcting unit performs an encoding process on the data to be written by the write process,
the controller performs control to write the data encoded by the encoding process into the first storage unit, and
the fourth storage unit further has a second work area for the encoding process.

10. The semiconductor memory device according to claim 8, wherein
the correcting unit performs an error correction coding process as the error correction process.

11. The semiconductor memory device according to claim 1, wherein the memory cells of the fourth storage unit and those of the third storage unit are of a same type.

12. The semiconductor memory device according to claim 11, wherein the third storage unit and the fourth storage unit are provided on one substrate.

13. The semiconductor memory device according to claim 1, further comprising an updating unit configured to update logical-to-physical translation information indicating association between a logical address that is associated with the data for which a request is made from the host device and that is specified by the host device and a physical address indicating a place in the first storage unit where the data are stored, wherein
each time the write process is completed, the updating unit adds the physical address of the data written into the first storage unit by the write process and the logical address in association with each other to the logical-to-physical translation information.

14. The semiconductor memory device according to claim 13, wherein
the first storage unit stores therein the logical-to-physical translation information.

15. The semiconductor memory device according to claim 13, wherein
the second storage unit stores therein the logical-to-physical translation information.

16. The semiconductor memory device according to claim 1, wherein
the controller further includes a search control unit configured to control a search process of searching for the data associated with a key in response to a search request from the host device containing the key associated with the data, and
the fourth storage unit further has a work area for the search process.

17. The semiconductor memory device according to claim 16, wherein
the fourth storage unit further has an area for storing second saved data that represents the data searched for by the search process, and
the third storage unit further has an area for storing a duplicate of at least a piece of second saved data among the second saved data stored in the fourth storage unit.

18. The semiconductor memory device according to claim 1, wherein
a type of the memory cells of the fourth storage unit is different from a type of the memory cells of the third storage unit.

19. The semiconductor memory device according to claim 1, wherein
the first storage unit is a NAND flash memory, and
the third storage unit is any of a magnetoresistive random access memory, a phase-change random access memory, a resistance random access memory, and a ferroelectric random access memory.

* * * * *